United States Patent
Popp (10) Patent No.: US 8,342,564 B2
(45) Date of Patent: Jan. 1, 2013

(54) PRAM WITH AT LEAST ONE ADJUSTABLE HANDLE

(75) Inventor: Alexander Popp, Redwitz a.d. Rodach (DE)

(73) Assignee: ENDEPRO GmbH, Redwitz a.d. Rodach (DE)

( * ) Notice: Subject to any disclaimer, the term of this patent is extended or adjusted under 35 U.S.C. 154(b) by 241 days.

(21) Appl. No.: 12/452,884

(22) PCT Filed: Jul. 25, 2008

(86) PCT No.: PCT/EP2008/006121
§ 371 (c)(1),
(2), (4) Date: Apr. 19, 2010

(87) PCT Pub. No.: WO2009/015827
PCT Pub. Date: Feb. 5, 2009

(65) Prior Publication Data
US 2010/0207339 A1    Aug. 19, 2010

(30) Foreign Application Priority Data
Jul. 27, 2007   (DE) .......................... 10 2007 035 758

(51) Int. Cl.
*B62B 1/00*   (2006.01)
(52) U.S. Cl. ..................... 280/647; 280/655; 280/655.1; 280/47.371
(58) Field of Classification Search .................. 280/642, 280/647, 644, 47.34, 47.38, 648, 650, 655.1, 280/655, 47.371; 403/98, 109.1, 109.5
See application file for complete search history.

(56) References Cited

U.S. PATENT DOCUMENTS

| | | | |
|---|---|---|---|
| 6,168,174 B1 * | 1/2001 | MacDougall | 280/47.34 |
| 6,991,248 B2 * | 1/2006 | Valdez et al. | 280/647 |
| 7,188,858 B2 * | 3/2007 | Hartenstine et al. | 280/642 |
| 7,396,039 B2 * | 7/2008 | Valdez et al. | 280/644 |
| 7,404,569 B2 * | 7/2008 | Hartenstine et al. | 280/642 |
| 7,632,035 B2 * | 12/2009 | Cheng | 403/98 |
| 2006/0036255 A1 * | 2/2006 | Pond et al. | 606/86 |

FOREIGN PATENT DOCUMENTS

| | | |
|---|---|---|
| BE | 528 038 | 4/1954 |
| DE | 298 11 026 | 9/1998 |
| DE | 199 35 802 | 2/2001 |

* cited by examiner

*Primary Examiner* — Hau Phan
(74) *Attorney, Agent, or Firm* — Pandiscio & Pandiscio (57) ABSTRACT

A handle assembly for a baby carriage or stroller, the handle assembly comprising a handle (3) connected to an elastic element disposed in a tube member (2) of a chassis, and comprising an annular, double-connected body having a central through-opening and having a cross section in a first state smaller than an inner cross section of the tube member (2), and in a second state can be pressed outward to wedge within the tube member (2), wherein the elastic element is provided with parallel end faces and is disposed between upper (18) and lower rigid perforated elements (19) defining a spacing therebetween and being adjustable in an axial direction to exert axial pressure on end faces of the elastic element between the perforated elements (18,19) and to compressively deform the elastic element in an axial direction, wherein said elastic element avoids axial compressive deformation by stretching in a radial direction, and wherein the lower perforated element (19) is coupled to a traction element, and a bottom edge of a tube or sleeve (10) surrounding the traction element bears against an upper face of the upper perforated element (18).

16 Claims, 6 Drawing Sheets

PRAM WITH AT LEAST ONE ADJUSTABLE HANDLE

The invention is directed to a baby carriage, stroller or the like having a chassis, plural wheels, a superstructure and at least one height-adjustable handle.

BACKGROUND OF THE INVENTION

Since baby carriages, strollers and the like are pushed by different people, there is a need for their handle(s) to be made adjustable in terms of height, and in as infinitely variable a manner as possible. In addition, in the case of two mutually separate handles, as opposed to a pushbar, there is also frequently a need to adjust the handles to different pivot angles, i.e., for example, pointing toward each other in a line, or thrust upward and roughly parallel, or other positions between or beyond these settings.

Moreover, strollers—previously also known as "sport carriages"—are often used, for slightly older children, as easily transportable child transport devices that can, for example, be collapsed with few manipulations and quickly stored in the trunk of an automobile, e.g. for a Sunday drive or the like. The possibility of quick knockdown and setup—without elaborate handling—is especially important in this case, and this also naturally applies to handles or pushbars.

In addition, the mechanisms suitable for this purpose should not increase the price of the baby carriage or stroller unnecessarily.

The foregoing considerations have given rise to the problem initiating the invention, that of fashioning the handles of a baby carriage of stroller, using an inexpensive mechanism, so that they can be adjusted and locked quickly and easily, said mechanism also being suitable for connection to, addition to or incorporation into a tube of the chassis of a baby carriage or stroller.

SUMMARY OF THE INVENTION

This problem is solved in that the handle or handle(s) is/are (each) coupled or connected to a (respective) element which immerses in a tube of the chassis and whose cross section(s), in a first state, is/are (slightly) smaller than the inner cross section of the tube, and which in a second state can be at least partially pressed outward or spread so as to wedge itself firmly inside the tube.

A wedging arrangement of this kind makes it possible to lock the handle in any desired heightwise and/or rotational position, and thus to adjust it in an infinitely variable manner. This adjusting mechanism is also relatively easy to construct, and is therefore economical. In addition, it is suitable for incorporation into the chassis of a baby carriage or stroller.

If, as the invention further provides, at least one adjustable element is configured as an elastic ring, the outer circumference of that element can be forcefully pressed apart in the radial direction. A ring, i.e., a double-connected body, in contrast to a single-connected body, is only indirectly subject to a force acting against radial expansion, specifically in the form of an inner tension that opposes an increase in its circumference. The very elasticity of the body allows it to undergo broad, nondestructive expansion in the presence of comparatively little tension. In addition, a radially outwardly directed force might also be applied directly to the inner face of the ring. Such radial spreading would cause radial pressure to build up inside the annular body, thus forcing its outer jacket outward.

It has proven advantageous to provide that at least one elastic ring be exposed to axial pressure. This measure also ultimately has the effect of causing the outer jacket to spread out radially, since the annular body attempts to avoid axial compressive deformation by stretching in the radial direction while still maintaining its (radial) proportions, which can occur only in conjunction with an increase in its outer circumference. (Largely) homogeneous (elasticity) properties of the annular body make it possible to convert a comparatively low tension into relatively intense, nondestructive deformation.

An axial pressure can be created between the two end faces of the annular body in a particularly structurally simple manner through the use of two elements that are mutually adjustable in the axial direction, between which the annular body is disposed and which can, if necessary, be wedged in place.

The invention can be refined by having the two elements that are mutually adjustable in the axial direction be arranged concentrically to each other, correspondingly to the roughly constant cross section of a tube of the chassis of a baby carriage or stroller. The wedging elements can preferably each be a disk-shaped, particularly a circular-disk-shaped or annular-disk-shaped or ring-shaped body, preferably made of metal or a similarly firm or rigid material.

A preferred particularity of the invention resides in the fact that the distance from the spreadable body to the handle or its connecting joint is constant, i.e., fixed. The spreadable body can thus be adjusted along with the handle, i.e., the elements axially embracing the spreadable body and, where appropriate, compressing it. This can be achieved by having two bodies that generate axial pressure be connected to the adjustable handle unit. Such connection can be effected, for example, by means of rods and/or tubes, or, where appropriate, by means of a wire or other traction means.

On the premise that a rotationally symmetrical arrangement creates an even force distribution and thus avoids undesirable seizing of the adjustable unit inside a tube, preference is to be given to an arrangement in which one of the two mutually adjustable elements is configured as a tube, sleeve or the like, and the other as a rod, a tube, and/or as a wire or other traction means, that extends through said tubular or sleeve-shaped element.

Naturally, a rod, tube or the like connected to the lower clamping element must extend through the elastic ring(s) in order establish a connection to the handle unit.

A rod, tube or the like that extends through the spreadable bodies should widen cross-sectionally beyond, i.e. below, the elastic Ring(s), for example by means of a screwed-on disk, so as to engage an annular bottom end face of the spreadable body from below.

To transmit the rotational position of a firmly wedged spreadable body to a handle with as little torsion as possible, twisting of the connecting rods should be avoided, insofar as possible. To this end, the invention recommends that the rod have a cross section that deviates from the circular, for example an elliptical, elongate, X-shaped or star-shaped cross section. Such a design specification takes account of the fact that radially more, outward-lying regions of a connecting profile are more torsionally rigid than more inward-lying regions. An ideal cross-sectional shape is furnished, for example, by connecting tubes. Such a geometry should therefore also include a central connecting profile.

A central rod, tube or the like should be displaceable in the axial direction in relation to a rod, sleeve or the like surrounding it. This permits relative axial adjustment between these two elements, and thus also between disks that encompass the spreadable bodies on their respective top and bottom faces.

The locked or adjusted state of the spreadable body can be chosen by means of a lever that is disposed, particularly articulated to or formed on, the top end of a rod, sleeve and/or tube. This can be accomplished particularly by having the pivot position, rotational position and/or other position of the lever coupled to a device for changing the pressure on or in the spreadable body, in order to relay this information.

The pivot axis of the lever is preferably oriented transversely to the longitudinal axis of the rod and/or of the sleeve, since such a movement of the spreadable body cannot be effected through the guide tube of the chassis of the baby carriage. The adjusting movement of the handle thus is completely decoupled kinematically from the selecting movement of the lever, thus making it possible to integrate these two elements—handle and selection lever—together into one module or even into a single part.

Taking the inventive idea further, at least one lever can have at its articulated end a jacket portion that surrounds the pivot axis at least regionally along the longitudinal direction thereof. This jacket portion can be used to convert a change in the pivot angle of the selection lever into an (approximately) axial displacement of a part coming into contact with the jacket surface.

The jacket portion surrounding the pivot axis can extend eccentrically to this pivot axis in such a way that the distance of its circumference from the pivot axis changes in the circumferential direction in a cam-like manner.

To the extent that such a cam-shaped circumferential portion rests on an end-face region of the sleeve or the like, it communicates the eccentricity of the jacket surface, which depends on the pivot angle of the selection lever, to an element pressing on the spreadable body, preferably the upper pressing element.

Alternatively or cumulatively thereto, a traction element can be provided to pull upward on a pressing element, preferably the lower one, in a certain angular position of the selection lever, and thus (also) to exert pressure on the respective surface, specifically the bottom surface, of the spreadable body. Such a traction element can electively be configured as a rod, a tube, or alternatively as a wire or other flexible but minimally or non-expandable traction means.

It is within the scope of the invention that disposed on and outwardly embracing the sleeve is a cuff that can be fixed in and/or on the guide tube, for example that snaps into recesses thereof or extends through the guide tube and/or outwardly embraces it.

Finally, it is within the teaching of the invention that provided at the top end of the tube is an end cap that serves to guide the sleeve. Such an end cap can also be configured to snap into recesses in the guide tube and/or so as to encompass and/or embrace it from the top or the outside.

Other features, details, advantages and effects based on the invention will emerge from the following description of a preferred embodiment thereof and by reference to the drawing. Therein:

DETAILED DESCRIPTION OF THE INVENTION

A typical commercial baby carriage, stroller or the like is equipped with two handle units 1, each of which is longitudinally displaceably and fixably guided in a respective tube 2 of the chassis of the baby carriage.

In this system, the actual handle 3 is outside the guide tube 2, whereas the adjustable wedging mechanism 4 is inside the guide tube 2. A cuff that surrounds the tube 2 externally could be provided at a level below the handle 3, for esthetic reasons, for example, but also to keep out any rainwater that might enter the tube 2 from above; such a cuff is not illustrated in the drawing, however.

In the embodiment according to FIGS. 1 to 5, the handle 3 per se is illustrated in a simplified manner in the form of a lever 5; naturally, it could have an ergonomic shape, for example with depressions fashioned in it as deepened seats for individual fingers, etc.

This lever 5 is journaled to or connected to a pivot axis 6 extending transversely to the longitudinal axis of the tube 2. Said pivot axis 6 is held or journaled, on both longitudinal sides of the lever 5, in a part 7, specifically between two approximately parallel bearing plates or bearing shields 8.

Figure 3:
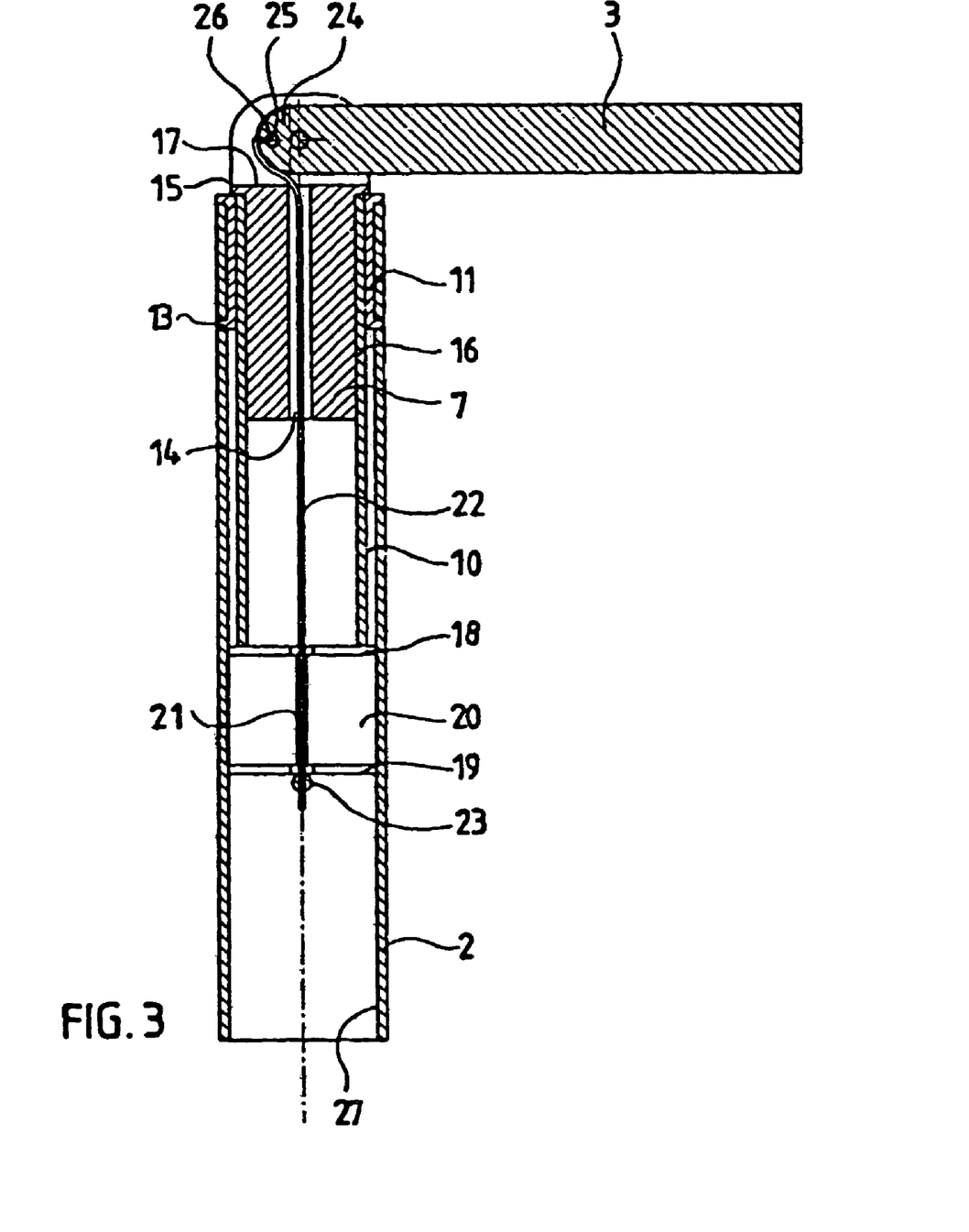
FIG. 3 is a longitudinal section through FIG. 1.

As can be appreciated from FIG. 3, setting aside the formed-on bearing shields 8, said part 7 has approximately the shape of a sleeve with relatively thick walls, such that only a small passage 9 with a diameter of, for example, 1 mm to 5 mm, particularly about 2 mm to 4 mm, remains at the center.

Setting aside the bearing shields 8 and the central through-opening 9, part 7 has approximately the shape of a stopper for sealing the tube 2; however, its outer diameter is smaller than the inner diameter of the tube 2, and it is received in a relatively thin-walled sleeve 10 whose inner diameter is adapted to the outer diameter of part 7, for example in the manner of a press fit or transition fit.

The sleeve 10 has a wall thickness of, for example, 0.5 mm to 2.5 mm, particularly of 1 mm to 2 mm, and it is longer than part 7, for example twice as long or even longer.

The outer diameter of the thin-walled sleeve 10 is smaller than the inner diameter of the tube 2, allowing them to slide frictionlessly one inside the other. The sleeve 10 is rotatably and displaceably guided by a guide cuff 11 at the top end of the tube 2.

The outer diameter of this guide cuff 11 is adapted to the inner diameter of the tube 2, while its inner diameter is adapted to the outer diameter of the thin-walled sleeve 10, in each case preferably more or less in the manner of a loose fit or a transition fit. The guide cuff 11 is fixed form-lockingly inside the tube 2, for example by means of a radially outwardly projecting rim or collar 12 disposed at its top end and resting on the end face of the tube 2, and/or by means of radially outwardly jutting protrusions 13 that snap into mating depressions or recesses 14 in the jacket of the tube 2. While the guide cuff 11 is immovably fixed in the tube 2 by these protrusions 13 and/or by the collar 12 it has at its top end, for the sleeve 10 it forms a sort of sliding guide that permits relative displacement and/or relative torsion, but prevents caught edges or other tilting.

Sleeve 10 is encompassed at its top end by a circumferential collar 15 of part 7, disposed in the region of the edge between the jacket surface 16 thereof and the upper end face 17 thereof, and thus can be displaced in relation to part 7 only until it butts against this collar 15.

Disposed below the bottom end of sleeve 10 is a first perforated disk 18 that has an approximately annular base area and is intersected at right angles by the longitudinal axis of the tube 2. The bottom edge of the sleeve 10 rests on the upper face of perforated disk 18 and can be connected, for example glued, soldered or welded, thereto, although this is not absolutely necessary for the function.

Disposed below first perforated disk 18 is a second perforated disk 19, which is preferably approximately coincident with the first. It is not immediately adjacent the first perforated disk 19, however, but extends in spaced relation to and below first perforated disk 18, preferably parallel thereto. An annular body 20 is preferably disposed between them.

Said annular body 20 has approximately the shape of a right circular cylinder with mutually parallel and coincident end faces, and through it passes a central through-opening 21 concentric with the longitudinal axis of the cylinder. Annular body 20 is preferably made of an elastic material, such as rubber, for example.

A traction means, for example a metal wire 22, extends concentrically within the tube 2, passing through the through-opening 14 of part 7, the upper perforated disk 18, the annular body 20 and the lower perforated disk 19.

Beneath lower perforated disk 19, the traction means or metal wire 22 is provided with a thickening, for example owing to a knot that is present there, or a bead 23 or the like through which the traction means or metal wire passes and which is fixed, for example firmly glued, thereto.

Since the diameter of the bead 23 or other thickening is larger than the inside diameter of the central opening in lower perforated disk 19, the traction means or metal wire 22 is unable to slip through it.

The upper end of the traction means or metal wire 22 is connected to the lever 5 of the handle 3. The lever 5 has a short region for this purpose on the far side of the pivot axis 6, and thus is effectively configured as a two-armed lever, although the handle 3 per se is very short in comparison to horizontal arm 24, i.e., approximately comparable to the thickness of lever 5, measured in a cross-sectional plane that is intersected at right angles by the pivot axis 6, particularly having a maximum length that is approximately between half the thickness of the lever 5 and the whole thickness thereof.

The top end of the traction means or metal wire 22 is anchored in or to this short arm 24, preferably on a plane spanned by the longitudinal axis of the handle 3 and by the pivot axis 6. An anchoring bore 25 extending parallel to the pivot axis 6 is preferably provided for this purpose in the second arm 24 of the lever 5, preferably along the central plane thereof. This can be configured as a through bore or a blind bore. It is, however, connected by a slit 26—for instance, along half the width of the handle 3—to the end face of the second lever arm 24. Whereas the width of the slit is approximately equal to the diameter of the traction means or metal wire, the diameter of the anchoring bore 25 located behind it is much greater, for example twice as large.

Also disposed at the top end of the traction means or metal wire 22 is a thickening, which, as in the case of the one provided at the bottom end of the traction means or metal wire 22, can be formed, for example, by a knot; or, alternatively, by an element that is affixed to the end of said traction means and has said traction means extending through it or encompassing it, and is connected thereto, for example by a glued, soldered or welded joint; or, alternatively, by a knot or the like. The diameter of the thickening is greater than the width of the slit 26, but smaller than the diameter of the anchoring bore 25 in the second arm 24 of the lever 5. The thickening can thus be pushed from a mouth of the anchoring bore 25 on into the latter, thus causing the traction means or metal wire 22 itself to pass through the slit 26. The thickening can be fixed, for example with glue, inside the anchoring bore 25. Where appropriate, however, the (optionally thickened) end of the traction means or metal wire 22 can also be overmolded with a lever module 5, 24 made of plastic in an injection molding process, and thus inseparably connected thereto.

From its exit point from the slit 26, the traction means or metal wire 22 bends downward to the tube 2 and ultimately passes into the mouth of through-opening 14 in part 7.

Figure 5:
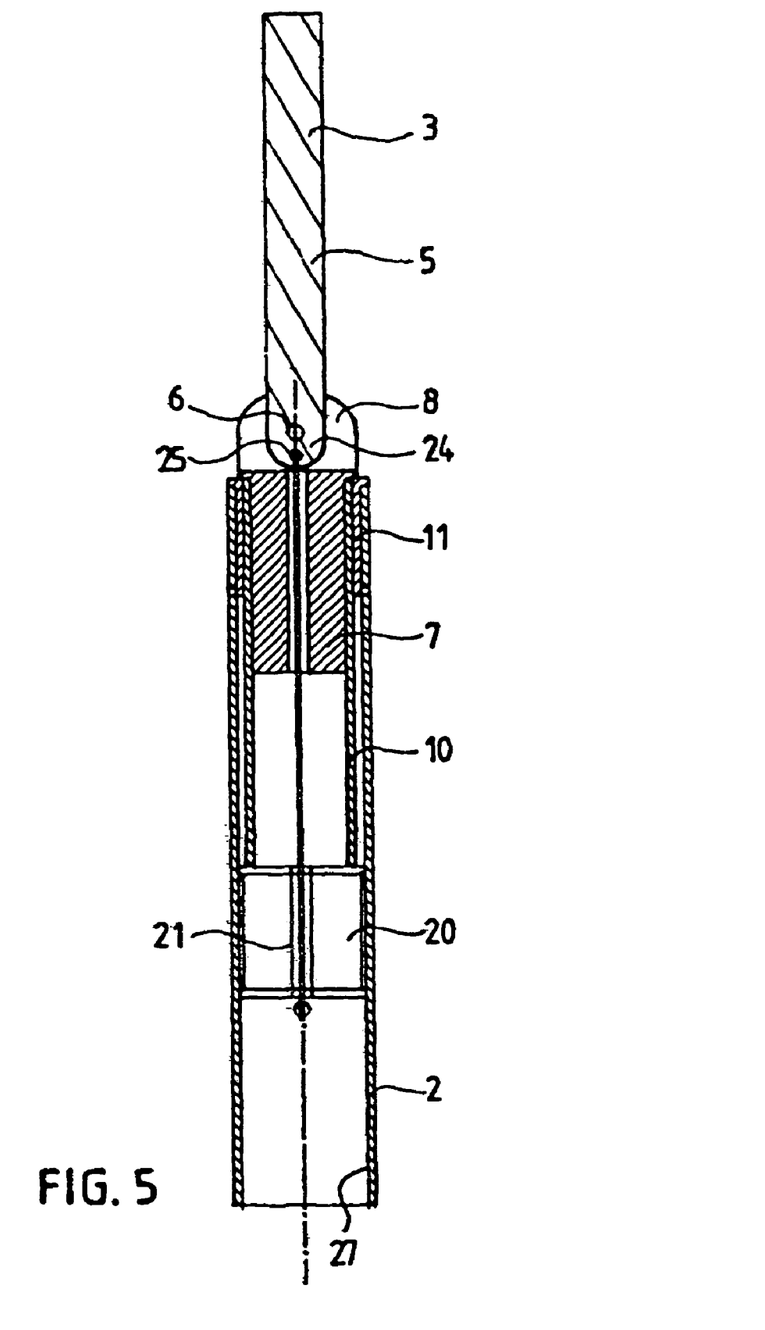
FIG. 5 is a longitudinal section through FIG. 4.

If lever 5 or handle 3 extends approximately in the direction of the longitudinal axis of tube 2, as depicted in FIG. 5, then the anchoring bore is approximately on the longitudinal axis of tube 2, not far from the upper mouth thereof. The length of the traction means or metal wire 22 is so calculated that in this state it can extend without tension from handle 3 all the way to lower perforated plate 19.

The wedging mechanism 4 is free of forces in this state, and annular body 20 thus resumes its original shape, in which its outer diameter is slightly smaller than the inner diameter of tube 2. The latter thus can be displaced freely within the tube 2, specifically slid up and down, in order to adjust the height-wise position of the handle 3, and rotated to the left and the right in order to adjust the rotational position of the handle 3 in relation to the tube 2.

Figure 1:
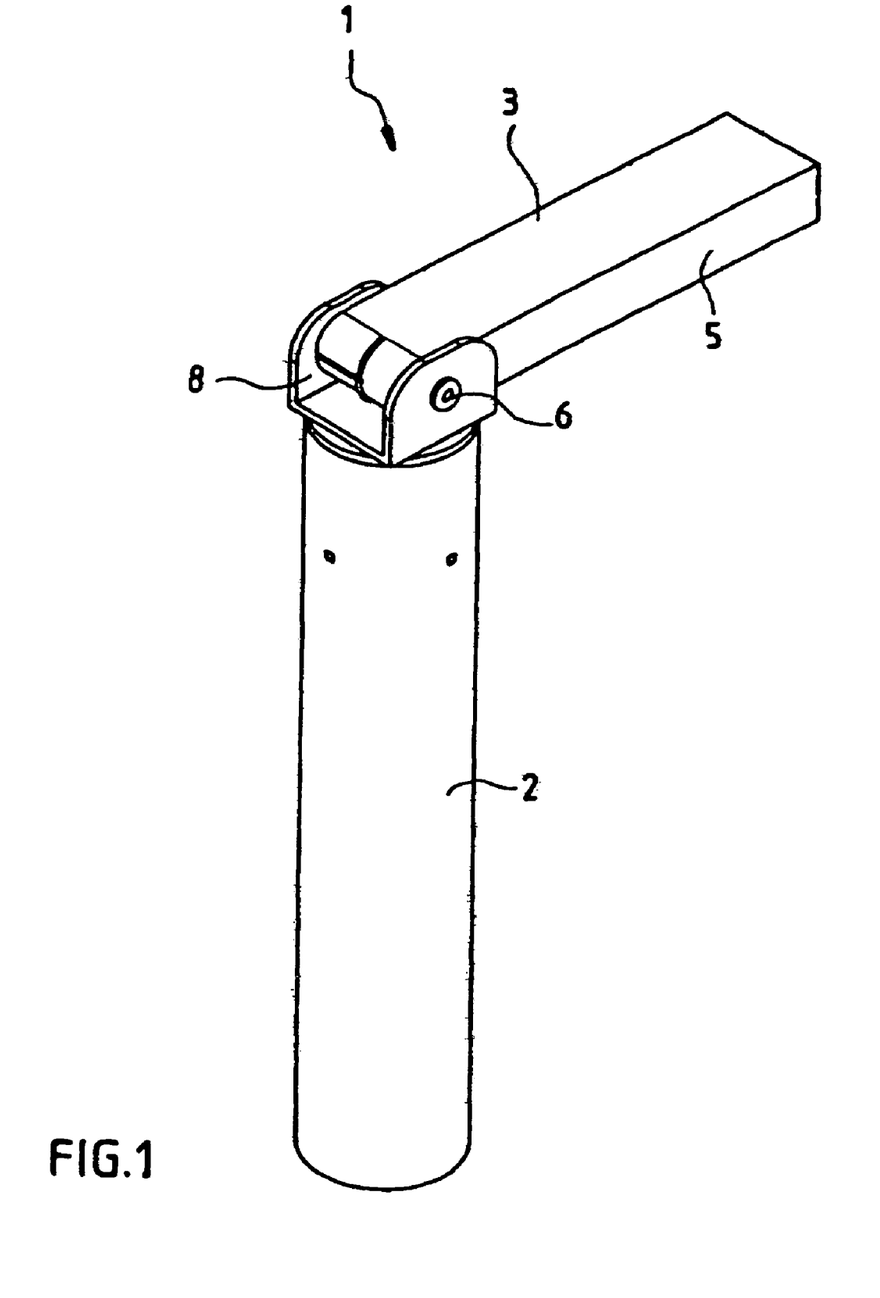
FIG. 1 shows the upper segment of an approximately vertically extending or steeply inclined guide tube of the chassis of a baby carriage or stroller, together with a handle insert that can be rotatably and displaceably adjusted and locked therein, in perspective view, in the locked state.
Figure 2:
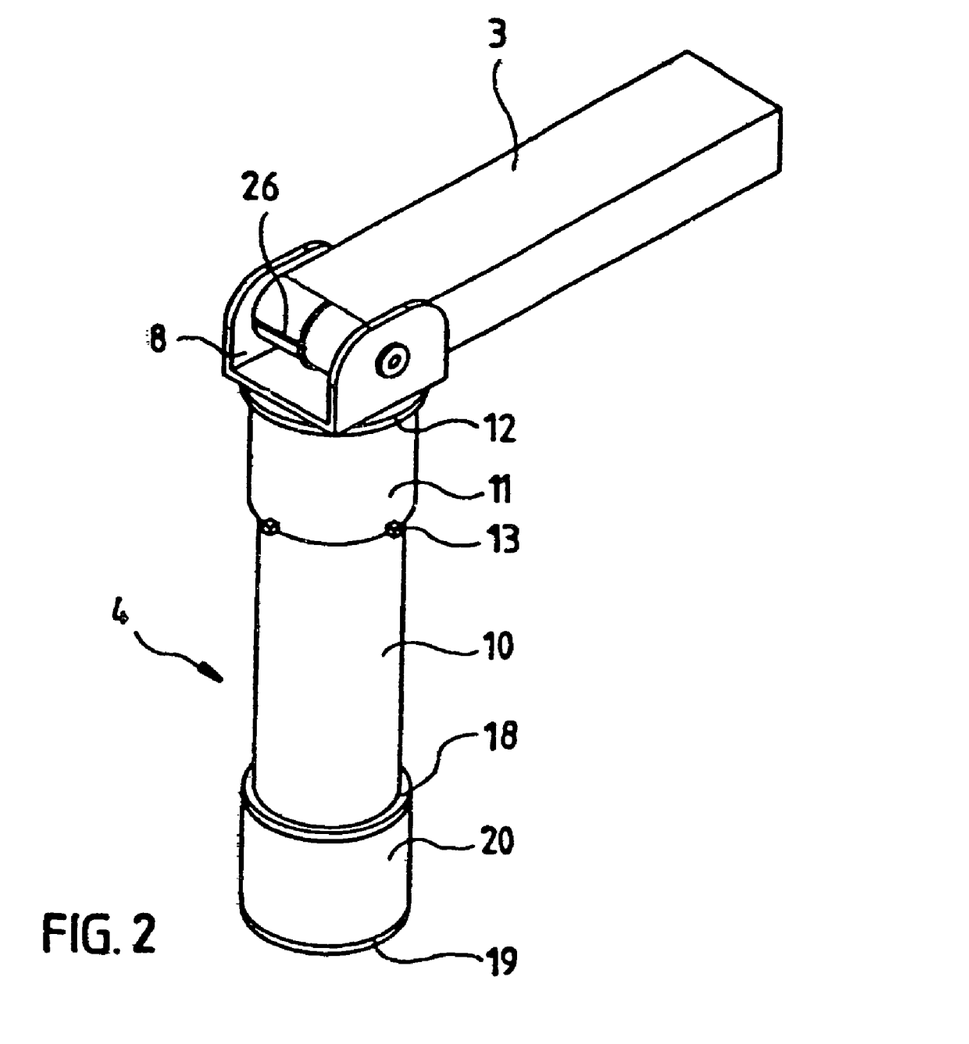
FIG. 2 shows the handle insert of the arrangement from FIG. 1 without the surrounding guide tube, from approximately the same perspective, also in the locked state.
Figure 4:
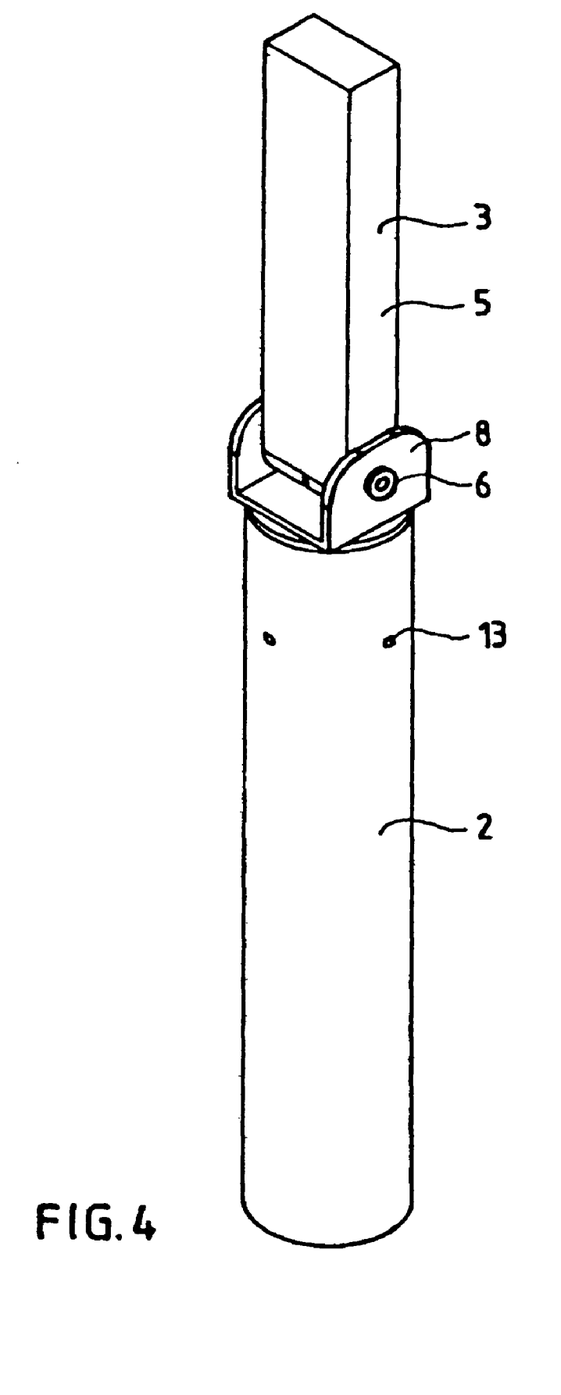
FIG. 4 shows the arrangement from FIG. 1 in a similar view, but in the rotationally and displaceably adjustable state.

As soon as a mother or other caregiver has thereby found a personally suitable position for the handle 3, the lever 5 of the handle 3 is pivoted downward from the position according to FIGS. 4 and 5 into the position according to FIGS. 1 to 3. As will be appreciated particularly by comparing FIGS. 3 and 5, in this process the anchoring bore 25 migrates distinctly away from its initial position near the mouth of tube 2: in FIG. 3, it is situated roughly at the same level as pivot axis 6, rather than beneath it, and is also shifted to one side. This causes the traction means or metal wire 22 to be pulled a little way out of the tube 2. At the same time, lower perforated plate 19, through which the traction means passes but which it cannot slip out of because of its bottom thickening, is carried along upward, whereas upper perforated plate 18, which has no contact with the traction means or metal wire 22, is not. The (vertical) spacing between the two perforated plates 18, 19 is decreased commensurately as a result.

This distance, however, is now smaller than the height of elastic annular body 20. The latter is therefore compressively deformed in the axial direction, i.e., in a direction parallel to the longitudinal axis of the tube 2. It attempts to avoid this deformation by simultaneously expanding in the radial direction, particularly radially outward. But since its original outer diameter is only slightly smaller than the inner diameter of the tube 2, in so doing it comes into contact with the inner face 27 of the tube 2. Since the tube preferably consists of a rigid material, for example metal, it does not yield, but resists the radial pressure of the annular body 20. The latter thus is pressed firmly, and thus friction-lockingly, against the inner face 27 of the tube 2, and is thereby, so to speak, immovably locked in place.

In this way, body 20, fixed in tube 2, communicates its vertical position and its rotational position via upper perforated plate 18, sleeve 10, part 7 and pivot axis 6 to lever 5 or handle 3, and also fixes the latter in relation to the tube 2. The handle 3 is now locked in the desired position, and the baby carriage can be used.

Figure 6:
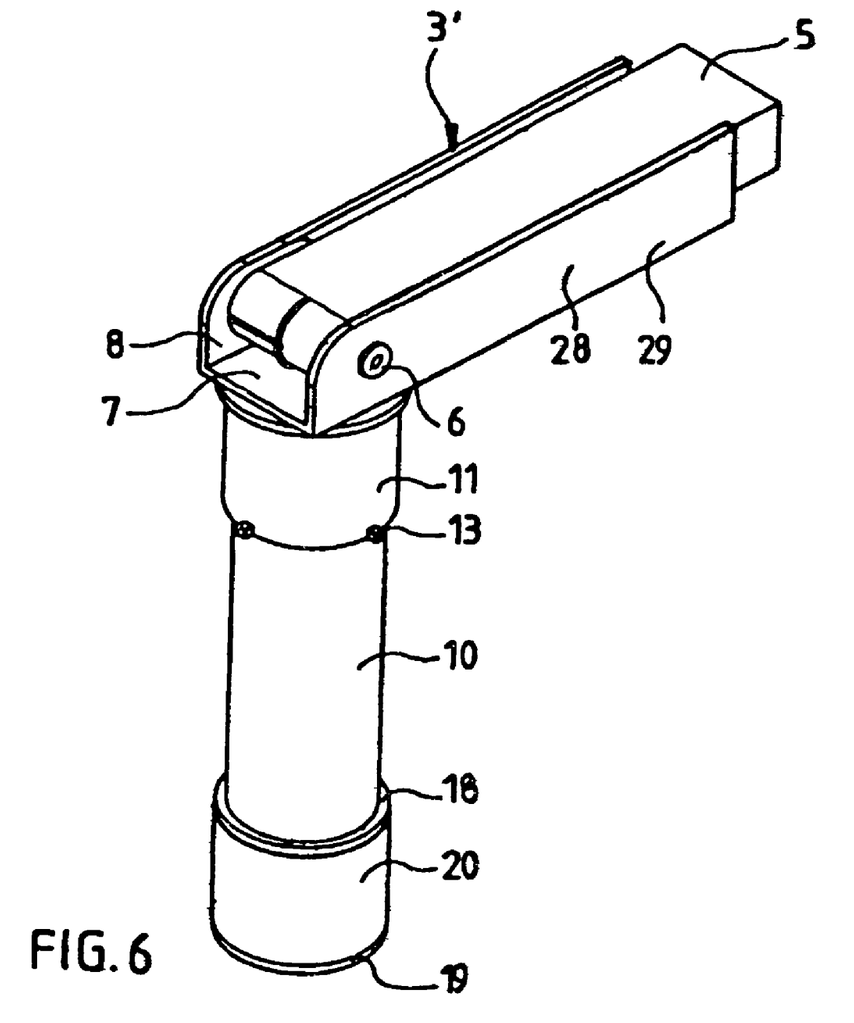
FIG. 6 is a depiction similar to FIG. 2 of a modified embodiment of the invention.

FIG. 6 shows a modified embodiment of the invention. The sole difference between this embodiment and the one described previously, however, is that the two bearing plates or bearing shields 8 are extended in their plane in one direction, specifically each in the same direction transversely to the longitudinal axis of the tube 2. This gives each of the two bearing shields a longish shape in the form of an elongated plate 28. These two plates extend approximately parallel to each other at a roughly constant distance apart, and they are connected to each other by a central web in the region of their respective bottom edges, i.e., at approximately the (axial) height of the upper end face of body 7. The overall effect is to yield more or less the shape of a lateral attachment 29 having an approximately U-shaped cross section.

The cross section of the trough within this attachment 29 is approximately identical to or slightly larger than the cross section of lever 5, such that lever 5, when pivoted downward, can sink without problems into the trough of attachment 29, as can be seen in FIG. 6. Attachment 29 is meanwhile able to embrace lever 5 along its entire length, and preferably also along its entire height.

The whole formed by attachment 29 and lever 5 pivoted thereinto constitutes the handle 3' in this embodiment. The advantage here is that while adjusting the handle 3', a person can constantly monitor the adjusted height and rotational position by referring to attachment 29, before locking these settings in place by pivoting the lever 5 downward.

The outer conformation of attachment 29 can be ergonomically designed, for example by means of engaging indentations or the like.

Various other modifications of the invention are conceivable. For instance, instead of a single annular body 20, a plurality of such bodies can be used, for example arranged behind or above one another in the axial direction; these can be directly adjacent each other or separated by interposed plates.

A form lock to prevent relative torsion could be created between the annular body or bodies 20 and the adjacent perforated plates 18, 19, particularly in the region of upper perforated plate 18, for example by means of prolongations formed on a perforated plate 18, 19 or by stamping and bending tabs out of a perforated plate 18, 19, which prolongations, bent tabs or the like are then able to fit into mating depressions in the annular body or bodies.

In addition, instead of a flexible traction means or metal wire 22, it is also feasible, where appropriate, to use a rod or even a tube or an optionally bent wire, or alternatively a chain or the like.

In the preferred embodiment, in the firmly wedged state an axial pressure is exerted on the annular body or bodies 20, decreasing the distance between two elements that engage this body or these bodies 20 from above or below, for example (perforated) plates or (perforated) disks 18, 19. This state should be stable in the absence of any external forces. This can by brought about, for example, by means of inhibiting frictional forces in a bearing part 6, 8 or by means of a geometric arrangement, for example after the fashion of a toggle lever, whose end positions are stable, or alternatively by means of a latching action, for example between the lever 3' and a prolongation 29 that embraces it.

In another state, on the other hand, little or no axial pressure is exerted on the annular body or bodies 20. This released state is preferably, but not necessarily, stable in the absence of external forces; it could, for example, be switched to the other, firmly wedged state by a restoring spring element, such that the resetting spring element would always have to be overcome to effect release and adjustment.

Various measures for switching from the released to the firmly wedged state may be contemplated. For one thing, an upwardly directed (additional) traction can be exerted on the element 19 engaging the annular body 20 from below, and/or a downwardly directed (additional) pressure is exerted (for example, by means of a cam on a pivotable lever 5) on the element 18 engaging the annular body 20 from above; either the two measures are combined with each other, or the respective other element 18, 19 is held fast during this process, for example by being connected to or integrated into the handle 3 or a bearing 8 thereof.

| List of Reference Characters | |
|---|---|
| 1 | Handle unit |
| 2 | Tube |
| 3 | Handle |
| 4 | Wedging mechanism |
| 5 | Lever |
| 6 | Pivot axis |
| 7 | Part |
| 8 | Bearing plate |
| 9 | Through-passage |
| 10 | Sleeve |
| 11 | Guide cuff |
| 12 | Collar |
| 13 | Protrusion |
| 14 | Recess |
| 15 | Collar |
| 16 | Jacket surface |
| 17 | End face |
| 18 | First perforated disk |
| 19 | Second perforated disk |
| 20 | Annular body |
| 21 | Through-opening |
| 22 | Metal wire |
| 23 | Bead |
| 24 | Arm |
| 25 | Anchoring bore |
| 26 | Slit |
| 27 | Inner face |
| 28 | Plate |
| 29 | Attachment |

The invention claimed is:

1. A handle assembly for a baby carriage or stroller comprising a chassis, plural wheels, and a superstructure, the handle assembly being adjustable in at least one of heightwise and rotational directions, said handle assembly comprising a handle (3) connected to at least one elastic element disposed in a tube member (2) of said chassis, the elastic element comprising an annular, double-connected body penetrated by a central through-opening and having a cross section that in a first, uncompressed state is smaller than an inner cross section of the tube member (2), and in a second, compressed state can be at least in part pressed outward so as to wedge firmly within the tube member (2), wherein the elastic element is provided with two mutually parallel and coincident end faces and is disposed between an upper perforated element (18) and a lower perforated element (19), each perforated element (18,19) being of a rigid material, a spacing between the two perforated elements (18,19) being adjustable in an axial direction, in order to exert axial pressure on end faces of the elastic element disposed between the perforated elements (18,19) and to compressively deform the elastic element in an axial direction, wherein said elastic element avoids axial compressive deformation by stretching in a radial direction, and wherein the lower perforated element (19) is coupled to traction element, and a bottom edge of a tube or sleeve (10) surrounding the traction means bears against an upper face of said upper perforated element (18).

2. The baby carriage or stroller handle assembly as in claim 1, wherein one of the two mutually adjustable elements is configured as a selected one of a rod, tube, wire (22) and traction means, and the other adjustable element is configured as a selected one of a tube or a sleeve (10) surrounding the rod, tube, wire (22) or traction means.

3. The baby carriage or stroller handle assembly as in claim 2, wherein the rod, tube, wire (22) or traction means extends through the elastic element.

4. The baby carriage or stroller handle assembly as in claim 3, wherein the rod, tube, wire (22) or traction means widens cross-sectionally beyond said elastic element, by means of a perforated disk (19) affixed thereto.

5. The baby carriage or stroller handle assembly as in claim 4, wherein the rod, tube, wire (22) or traction means has a selected one of an elliptical, elongate, X-shaped or star-shaped cross section.

6. The baby carriage or stroller handle assembly as in claim 5, wherein the rod, tube, wire (22) or traction means is displaceable in an axial direction of the tube member (2) in relation to the sleeve (10).

7. The baby carriage or stroller handle assembly as in claim 2, wherein a lever (5) is disposed in a region of a top end of the rod, tube, wire (22) or traction means or a tube, sleeve (10) surrounding the element.

8. The baby carriage or stroller handle assembly as in claim 7, wherein a pivot axis (6) of the lever (5) is oriented transversely to a longitudinal axis of the tube member (2).

9. The baby carriage or stroller handle assembly as in claim 7, wherein at least the lever (5) has in a region of an pivot axis a shorter, second lever arm (24) having a jacket portion that surrounds the pivot axis (6) at least regionally along a longitudinal direction thereof.

10. The baby carriage or stroller handle assembly as in claim 9, wherein fastened in a region of the second lever arm (24) is a rod, tube, wire (22) or traction means that extends into the tube member (2) and is coupled via a perforated disk (19) to an element (20) that can be pressed apart.

11. The baby carriage or stroller handle assembly as in claim 8, wherein the at least one lever (5) has at its articulated end a jacket portion (24) that surrounds the pivot axis (6) at least regionally along the longitudinal direction thereof.

12. The baby carriage or stroller handle assembly as in claim 11, wherein said jacket portion (24) extends eccentrically to the respective pivot axis (6), such that the distance of the circumference thereof from the pivot axis changes in a cam-shaped manner in a circumferential direction.

13. The baby carriage or stroller handle assembly as in claim 12, wherein the cam-shaped circumferential portion rests on an end-face region of the sleeve.

14. The baby carriage or stroller handle assembly as in claim 13, wherein the cam-shaped portion is arranged so as to press the pivot axis and the thereto-coupled rod in the axial direction away from the sleeve when the two levers are pressed together.

15. The baby carriage or stroller handle assembly as in claim 1, wherein provided at a top end of the tube member (2) is a guide cuff (11) that serves to guide the sleeve (10) within the tube member (2).

16. A handle assembly for a baby carriage or stroller comprising a chassis, plural wheels, a superstructure, the handle assembly comprising a handle (3) adjustable in at least one of heightwise and/or rotational directions, said handle (3) being connected to at least one elastic element, disposed in a tube member (2) of the chassis, the elastic element comprising an annular, double-connected body penetrated by a central through-opening and having a cross section that in a first, axially uncompressed state is smaller than an inner cross section of the tube member (2), and in a second, axially compressed state can be at least partially pressed outwardly so as to wedge firmly within the tube member (2), wherein the elastic element is provided with generally the shape of a right circular cylinder with two mutually parallel and coincident end faces and with a through-opening (21) that extends concentrically with the longitudinal axis of the cylinder, and is disposed between an upper perforated disk (18) and a lower perforated disk (19), each disk being of a rigid material, spacing between the two perforated disks (18,19) being adjustable in an axial direction, in order to exert axial pressure on end faces of the elastic element disposed between the two perforated disks (18,19) and to compressively deform the elastic element in an axial direction, wherein said elastic element avoids axial compressive deformation by expanding in a radial direction, and wherein the lower perforated disk (19) is coupled to a traction means, and a bottom edge of a tube or sleeve (10) surrounding the traction means and connecting the respective perforated disk (18) to the handle unit bears against an upper face of the upper perforated disk (18).

* * * * *